United States Patent [19]

Nakamura et al.

[11] 3,866,121

[45] Feb. 11, 1975

[54] RADIO-FREQUENCY RELAY SYSTEM

[75] Inventors: Shinichi Nakamura; Kazuo Morita; Masami Takada, all of Tokyo, Japan

[73] Assignees: Nippon Telegraph & Telephone Public Corporation; Nippon Electric Company, Limited, both of Tokyo, Japan

[22] Filed: Nov. 21, 1972

[21] Appl. No.: 308,621

[30] Foreign Application Priority Data

Nov. 24, 1971 Japan ................................ 46-94716

[52] U.S. Cl. ........................................ 325/2, 325/56

[51] Int. Cl. .............................................. H04b 1/60

[58] Field of Search ............. 325/2, 3, 56, 303, 304; 340/147 SC, 147 C; 333/2, 3; 178/69 G; 179/170 R, 170 A

[56] References Cited

UNITED STATES PATENTS

| | | | |
|---|---|---|---|
| 2,666,845 | 1/1954 | Colton et al. | 325/5 |
| 2,680,162 | 6/1954 | Brehm et al. | 333/3 |
| 2,733,296 | 1/1956 | Maggio | 325/2 |
| 3,111,624 | 11/1963 | Farkas | 325/3 |
| 3,681,694 | 8/1972 | Sarati | 340/147 SC |

*Primary Examiner*—Benedict V. Safourek
*Attorney, Agent, or Firm*—Sughrue, Rothwell, Mion, Zinn & Macpeak

[57] ABSTRACT

A radio frequency relay system including at least two regular and independent transmission paths and a spare transmission path zigzagging between repeater stations in the regular independent transmission paths. The spare path provides an alternate route for signals of any of said regular paths when sections of the regular paths have high signal degradation qualities, such as rain or fog for high frequency signals. At various repeater stations of each regular path a common repeater is used which is capable of receiving and transmitting signals in either the regular path or the spare path.

2 Claims, 7 Drawing Figures

RADIO-FREQUENCY RELAY SYSTEM

This invention relates to a microwave relay system and, more particularly, to a microwave relay system in which intelligence signals are relayed over long distance by means of a plurality of spaced repeater stations.

The propagation properties of a radio relay line are greatly affected by the attenuation in the receiving power which appears in the frequency range above 10 GHz extending to the light wave region due to radio-wave scattering and absorption caused by rain and fog. The attenuation caused by rain shows a sharp increase in the frequency range above 10 GHz, while that due to fog in the range above 200 GHz. In any case, the attenuation increases with the increase in frequency.

As is shown in FIG. 1, a conventional relay system comprises a relay line adapted to transmit a modulated carrier wave of frequency band $F_1$ through repeater stations (indicated by circles) installed between two terminal stations A and B. In FIG. 1, the distance between the terminal stations A and B is shown by $l$ and the repeater spacing between adjacent repeater stations is shown by $d$. Furthermore, in a conventional route diversity system, as shown in FIG. 2, in which two relay routes of carrier waves of frequencies ($F_1$) are provided between the two terminal stations A and B, and the repeater spacing between the adjacent repeater stations (indicated by circles) is $n$ times ($n > 2$) as large as that of FIG. 1, the information signals are transmitted through the two routes in parallel or through one route which is switched to each other between the two routes. The route diversity system is capable of preventing the transmission line from the interruption which can not be relieved by the system shown in FIG. 1. As mentioned above, the length of repeater spacing in this system is $n$ times greater than that shown in FIG. 1 and the number of repeater stations included in one route is $m$ ($= l/nd$). Hence the number of repeater stations as a whole is $2m$ ($=2l/nd$), instead of $l/d$. In other words, the number of repeater stations in the system as in FIG. 2 is reduced by a factor of $2/n$ by maintaining a condition where $n$ is larger than 2. In a practical relay line comprising two routes, there is limitation on $n$. The number of repeater stations in the system in FIG. 1 and that in FIG. 2 are in the ratio ($2/n$) of about 1 to ½. From the economical point of view, there is not much difference between the two systems. Furthermore, the two routes independently use repeater stations, that is, each route individually needs monitor and control systems, power supply, and maintenance, and does not commonly use these with each other. Such disadvantage is left unsolved in the system comprising three routes, of which two are regular lines and the rest for spare (stand-by) line, with the function of switching one regular line falling into failure to the spare line.

An object of the present invention is to provide a relay system free from drawbacks inherent to the conventional diversity relay systems.

Another object of this invention is to provide an economical relay system.

Further object of this invention is to provide a relay system which ensures a high transmission reliability.

A feature of the relay system of the present invention is that a plurality of regular relay lines each of which has many repeater stations and relays for an individual information signal are installed, that at least one spare relay line zigzag crossing the repeater stations on the regular lines is installed, and that common-used repeater stations used in common to the regular relay lines and the spare relay line divide the repeater stations on said regular relay lines into groups. In this system, any one section on the regular line lying between the two common-used repeater stations can be switched on the time division fashion to the spare relay line in response to failure with the section on the regular line, minimizing the number of repeater stations necessary for the system as a whole and assuring higher reliability than in conventional repeater systems.

For better understanding of the invention, embodiments of the system of the invention will hereinafter be described by referring to the appended drawings, in which:

FIG. 1 schematically illustrates an arrangement of a priorart relay line;

FIG. 2 schematically illustrates a route diversity system constituted in the conventional manner;

Figure 5:
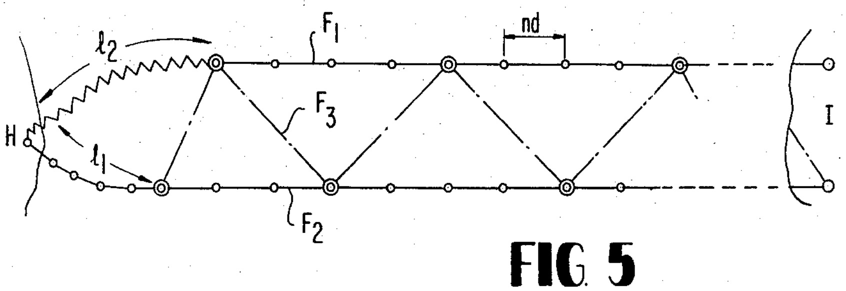
Figure 6:
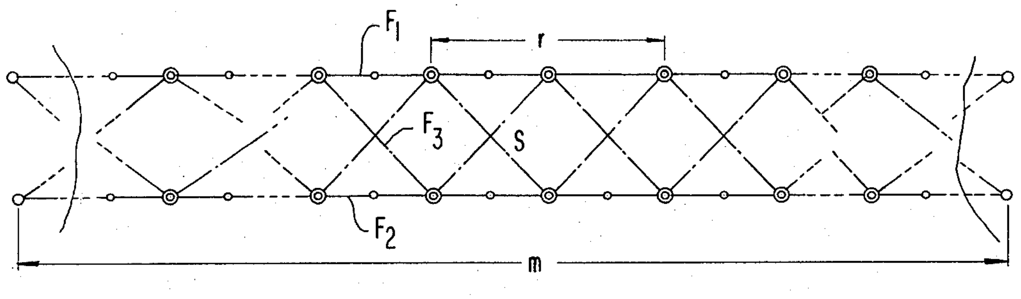
Figure 7:
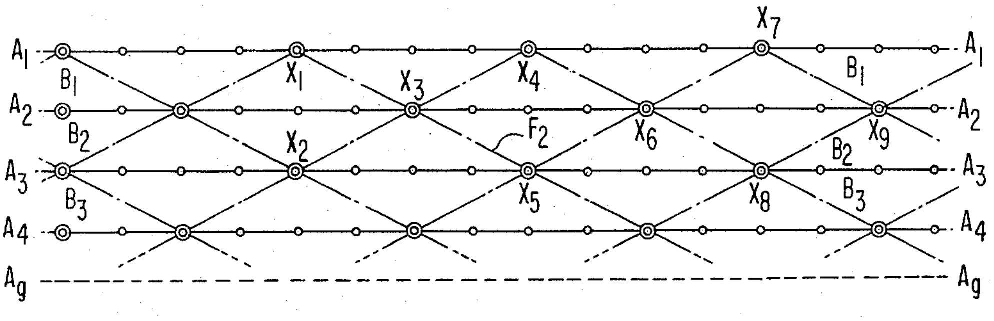

FIG. 5, 6, and 7 are diagrams showing other embodiments of this invention.

Figure 3:
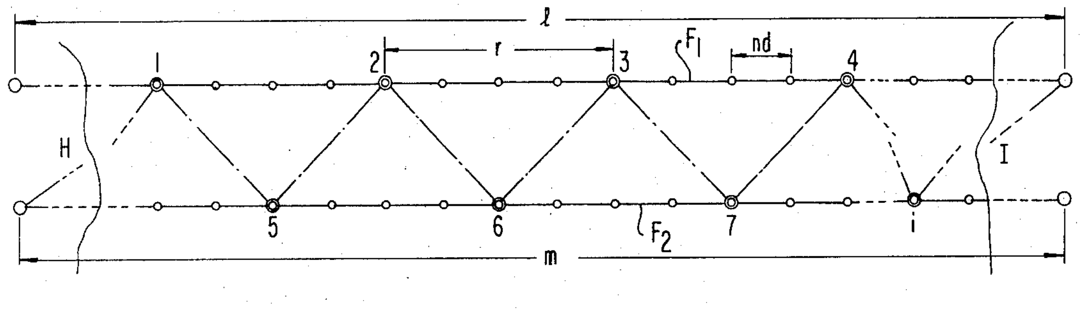
FIG. 3 is a diagram illustrating the system embodying the present invention.

FIG. 3 schematically illustrates an embodiment of the invention in which two regular relay lines from two terminal stations located in H area to two terminal stations located in I area are installed far apart from one another by several kilometers by employing carrier waves of frequency bands $F_1$ and $F_2$ in the frequency range above 10 GHz. A spare relay line adapted to the carrier wave of frequency band $F_3$ is zigzag-installed by common-used repeater stations (indicated by double circles) included in said regular lines. The spare line can serve two regular lines in a manner mentioned later. Although the relay lines (regular lines and spare line) from I area to H area having the same construction as mentioned above are also installed, this line is neglected in the following discription, for simplicity. As a matter of course, information signals transmitted through respective regular relay lines are different from one another. It is needless to say that upon detection of a trouble on either of the regular relay lines, the transmission on the line is turned to the spare relay line. It is however possible to make the spare relay line serve the purpose of transmitting auxiliary signals when both the regular relay lines are in a normal state.

Further, frequencies to be alloted to the spare relay lines should preferably be lower than that of the regular lines to avoid the effect of the attenuation due to heavy rain whose cross-over distance may be several kilometers.

Referring to FIG. 3, a regular line is divided into ($m/r$) repeater sections-groups by the common-used repeater stations (1, 2, 3, 4, 5, 6, 7, . . . , and $i$). The symbol $m$ denotes the number of repeater sections included in each regular line, and $r$ the number of repeater sections on the regular line between two common-used repeater stations. While $m$ and $r$ need not be identical between the two regular lines, the following description will be given, for simplicity, as to the case where there is no difference. Since only one spare line is installed in common to two regular lines, either of the two terminal stations at the H area and I area have no spare line as shown in FIG. 3. Therefore, it may be desirable in the section lying between the non-spare line connected terminal station and the adjacent repeater station to shorten the spacing between repeater stations lying in the section or to employ a cable transmission system rather than a radio transmission system.

Figure 4:
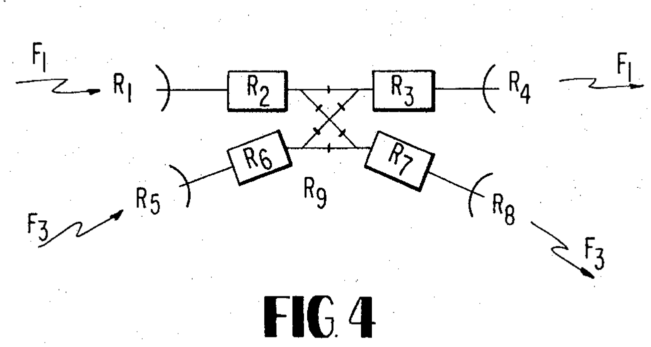
FIG. 4 is a schematic diagram showing repeater station which is employed in the system of FIG. 3.

As is illustrated in FIG. 4, a common-used repeater station in common use comprises components $R_1$, $R_2$, $R_3$ . . . $R_9$, of which $R_1$, $R_4$, $R_5$, and $R_8$ are matching circuits comprising antenna and transducers (not shown), while $R_2$, $R_6$, $R_3$, and $R_7$ are circuits comprising two receivers on the input sides and two transmitters on the output sides, and $R_9$ is a switching circuit for selectively connecting any of the receivers to any of the transmitters. The transmission lines of $F_1$ or $F_2$ and $F_3$ are arranged to be switched by the switching circuit $R_9$ installed in the radio frequency circuit, the intermediate frequency circuit or the base band frequency circuit, depending on the kind of repeater system such as heterodyne repeater system or demodulation repeater system etc.

The switching between the regular and spare lines by the switching circuit $R_9$ is performed at the time point when attenuation or distortion etc. occurring in the section reaches the acceptable value. This time point is detected by circuits included in a common-used repeater station such as rain intensity meter provided to detect the rain intensity in an individual sections-group, an automatic gain control circuit (AGC) of the receiver at the station, a code error rate detecting circuit disposed at a pulse regenerating circuit in digital-relay, a noise detection circuit included in a demodulation relay system, and pilot detection circuit etc. The output of the detecting circuit is led to the switching circuit for the switching contact.

It is assumed here that the regular line is switched to the spare line in an irregular state. When an attenuation occures in the sections-group lying between the common-used repeater stations 2 and 3, the repeater station 3 operates to switch from the receiving circuit $R_1$ and $R_2$ for $F_1$ to the receiving circuits $R_5$ and $R_6$ for $F_3$ by the switching circuit $R_9$ for the transmission from the H area to I area.

Since there is provided a return transmission from I to H areas, as mentioned above, the repeater station 2 is able to detect the same attenuation. According to the detection, the signal from H area received by the receiving circuits $R_1$ and $R_2$ (FIG. 4) for $F_1$ is caused to switch to be transmitted via the $F_3$ transmitting circuit of $R_7$ and $R_8$. Accordingly, the signal which has been transmitted from H to I areas via the $F_1$ circuit of the regular line (i.e., the circuit including the repeater stations 1, 2, 3, and 4) is switched to pass through the $F_3$ circuit of the spare line (i.e., repeater stations 1, 2, 6, 3, and 4) by way of the common repeater station 6 (i.e., $R_5$, $R_6$, $R_9$, $R_7$, and $R_8$), which are the state of hot-standby. Thus, the reliability of the information which has been transmitted through the regular line using the carrier wave of $F_1$ can be maintained by switching to the spare line. This is because frequency $F_3$ of the carrier wave of the spare line is less affected than frequency $F_1$ of the regular line is, due to the frequency difference, or because the area covered by the spare line has no rain.

It is needless to say that the transmission from I area to H area is simultaneously relieved according to the above-mentioned manner.

Moreover, at the time of the occurrence of the attenuation at more than two sections-groups of one regular line (e.g. sections-groups 2–3 and 3–4 in FIG. 3), the line reliability can be also maintained by switching the corresponding sections-groups to the spare line (e.g. repeater stations 1, 2, 6, 3, 7, and 4).

Even though attenuation arises at section-groups in two regular lines (e.g., section-groups 1–2 and 6–7), it is possible to maintain the transmission reliability at an acceptable value depending on the spare line constructed by appropriate switching (e.g., assigning spare line including repeater stations 1, 5, 2, 3, and 4 to the signal which has been transmitted through the regular line of $F_1$ and that including stations 5, 6, 3, 7, and *i* to that of $F_2$).

In the case of one-way relay system, it is apparent that the above-mentioned advantage can be appreciable by switching in response to an order-wire signal which is transmitted from a receiving common-used repeater station in the deteriorated sections-group to the transmitting common-used repeater station via the additionally constructed cable.

It seems that the reliability of the system of FIG. 3 has a disadvantage because only one spare is prepared to the two regular lines. However, since the heavy rain cell, having a dimension of several kilometers across, appears at random, the system of FIG. 3 exhibits a performance comparable to the route diversity system of FIG. 2 with respect to the reliability. In other words, as mentioned above, the conventional route diversity system has no relief means while two transmitting lines fall into failure, whereas the system of FIG. 3 can continue to transmit even though two regular lines incur attenuation.

It is assumed that each relay line includes radio channels numbering M. Then, in the system shown in FIG. 2, the number of relay sections (i.e., the number of transmitters and receivers) per radio channel is $2mM/M = 2m$. In contrast, that for the system shown in FIG. 3 is obtained as $(2mM + SM)/2M = m + (S/2)$, where 2M is a total number of the signals for $F_1$ and $F_2$ lines. Since the total number S of sections of $F_3$ line is $m/2$, the system is FIG. 3 is more economical than the system in FIG. 2. Although the system in FIG. 3 requires a switching circuit which is not necessary for the system in FIG. 2, the site of repeater station, tower, office and power supplies are not needed for the spare line because these provisions can be used in common for the regular circuits. This greatly contributes to making the line economical.

Figure 1:
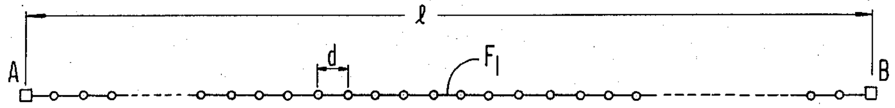
Figure 2:
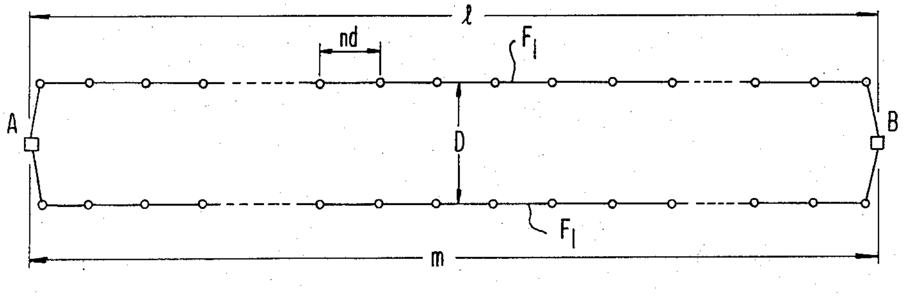

In FIG. 3, the regular lines based on $F_1$ and $F_2$ consist of the same m repeater sections, as described above. In a practical system, however, the number of sections is not the same in most cases. Even so, this will not limit the foregoing advantageous functions of the system of the invention. Generally, the system of the invention can be made more economical than the conventional route diversity system as shown in FIG. 2 when $S < 2m$.

In general, the frequency difference between the regular and spare lines depends on the angle formed between the regular and spare lines at the common-used repeater station, the length of the repeater spacing, etc. In other words, the frequency difference is determined by the concurrent attenuation occurrency probability at which regular and spare lines simultaneously reach the acceptable attenuation value. When both the regular and spare lines have an identical frequency, the failure occurence rate of the spare line will become high, because a general spacing on the spare line between the common-used repeater stations is longer than that on the regular line. But the identical frequencies may be used by taking such a means as an intermediate repeater station installed between the two corresponding common-used repeater stations on the spare line.

FIG. 5 shows a system in which the system of FIG. 3 is applied to a case in which there is one terminal station in the H area and two terminal stations in the I area. Also two regular lines have individual signals. In terminal area H in FIG. 5, the two relay lines may happen to pass through a zone where the correlation factor of failure rate is nearly 1. In other words, two regular lines simultaneously fail to pass the signal at the zone in H area. In such case, it is desirable to protect the line reliability against rain by shortening the spacing of repeater section to be sufficiently reliable against rain intensity ($l_1$), or by using a waveguide ($l_2$), coaxial cable, or the like for shielding the line from rain.

In general, a cable may be used at any section depending on geographical conditions.

Another embodiment of the invention is shown in FIG. 6 in which repeater stations of two relay lines adapted to $F_1$ and $F_2$ are used, and dual spare relay lines using $F_3$ are installed. In comparison with the system in FIG. 3, the numbers of transmitters and receivers and antennae are increased in the system as in FIG. 6. However, when the angle formed between the regular line and the spare line at a common-used repeater station is small, and the concurrent attenuation occurrence probability is large, the system in FIG. 6 has higher reliability, compared with that in FIG. 3. This means that the spacing of repeater section can be elongated and the number of repeater stations can be further reduced than in the system in FIG. 3 with respect to a given failure rate of the regular line. The frequencies of spare lines need not to be fixed in $F_3$, but may be different from each other.

Still another embodiment of the present invention is shown in FIG. 7 wherein the multiple regular lines ($A_1$, $A_2$, $A_3$, $A_4$ . . . and $A_g$) and spare lines crossing the regular lines are installed. In this system, a flexible switching is carried out. For example, to relieve a damage of the $A_1$ line, the spare line linking the common-used repeater stations ($X_1$, $X_3$, $X_5$, $X_6$, and $X_7$) may be used. To relieve $A_2$ line, the spare line linking the stations ($X_3$, $X_5$, $X_6$, $X_7$, and $X_9$) may be put into operation.

The principles of the invention have been described above on the assumption that different frequencies are used for the regular line and the spare line. The invention is equally applicable where the frequencies alloted to the regular and spare lines are required to be the same because of restriction on the allocation of frequency or by other reasons. Also, identical frequency may be allotted to each of the regular lines. In FIG. 3, for example, if the same frequency is used for the two regular lines and spare line, it may be so arranged that the common-used repeater station in FIG. 4 with $R_6$, $R_7$, and $R_9$ removed is used and antennae $R_1$ and $R_5$ are connected to circuit $R_2$ and antenna $R_4$ and $R_8$ to circuit $R_3$. By switching the switches respectively installed between the receiving antenna ($R_1$ and $R_5$) and the receiving circuit ($R_2$) and the transmitting circuit ($R_3$) and the transmitting antenna ($R_4$ and $R_8$), the transmission is switched.

The foregoing description has been given chiefly on the propagation interference or attenuation in connection with relay lines of radio-relay system. It will be apparent however that the invention is equally effective for the failure of repeater stations.

The line reliability should be maintained against failure with any relaying equipment, cable, power supply system, etc. even in such relay systems as those using for their transmission channels a waveguide, coaxial cable, light cable, or the like. Therefore, the system of the invention finds a broad range of useful applications.

Furthermore, it is needless to say that the transmission signal passed through the spare line section is switched to the regular line upon the timepoint when the return of a transmission property from a failed condition to a normal condition is detected by means of a detecting circuit such as rain intensity meter.

What is claimed is:

1. A radio frequency relay system for use in the frequency range above 10 GHz, comprising:

a first radio signal transmission path comprising a first plurality of consecutively positioned relay stations, each of said first plurality of relay stations comprising receiving means adapted to receive a radio frequency signal in said first radio signal transmission path, transmitter means for transmitting a radio frequency signal along said first radio signal transmission path, and means connecting said receiving means and said transmitting means for causing said transmitting means to transmit said received radio frequency signal, a second radio signal transmission path, located over one kilometer away from said first radio signal transmission path, comprising a second plurality of relay stations, each of said second plurality of relay stations comprising receiving means adapted to receive a radio frequency signal in said second radio signal transmission path, transmitter means for transmitting a radio frequency signal along said second radio signal transmission path, and means connecting said receiving means and said transmitting means for causing said transmitting means to transmit said received radio frequency signal, and a spare radio frequency transmission path formed at an angle with respect to and intersecting said first and second radio frequency transmission paths, said spare transmission path comprising at least two of said first plurality of relay stations (first and third relay stations) and one of said second plurality of relay stations (second relay station), wherein, said first relay station comprises auxiliary transmitter means adapted to transmit a radio frequency signal along said spare path towards said second relay station, and switch means for selectively connecting said relay station receiver means to said auxiliary transmitter means to cause the signal received along said first path by said receiver means to be transmitted along said spare path by said auxiliary transmitter means, said second relay station comprises auxiliary receiver means adapted to receive a radio frequency signal emanating from the auxiliary transmitter of said first relay station, auxiliary transmitter means adapted to transmit a radio frequency signal along said spare path towards said third relay station, and switch means for selectively connecting together said auxiliary receiving and transmitting means of said second relay station for causing a radio signal received by said auxiliary receiving means to be transmitted by said auxiliary transmitting means, and said third relay station comprising auxiliary receiving means adapted to receive a radio frequency signal emanating from the auxiliary transmitter of said second relay station, and switch means for selectively connecting said auxiliary receiving means to said relay station transmitting means to cause the signal received along said spare path by said auxiliary receiver means to be transmitted along said first path by said transmitter means.

2. A radio frequency relay system as claimed in claim 1 wherein each of said relay stations forming a part of said spare path and one of said first and second paths comprises, in addition to said receiving means and transmitting means, an auxiliary receiving means and an auxiliary transmitting means adapted for receiving and transmitting radio frequency signals along said spare path, first normally closed switch means connecting said receiving means to said transmitting means, secondly normally closed switch means connecting said auxiliary receiving means to said auxiliary transmitting means, first normally open switch means connected between said auxiliary receiving means and said transmitting means, second normally open switch connected between said receiving means and said auxiliary transmitting means, whereby attenuation in between two consecutive repeating stations in either said first or second paths can be avoided by opening said normally closed switches, and closing at least one of said normally open switches in each said two relay stations.

* * * * *